United States Patent
Kim

(10) Patent No.: US 12,290,208 B2
(45) Date of Patent: May 6, 2025

(54) VERTICALLY MOVABLE MIXER

(71) Applicant: Sallytec Co., Ltd., Seoul (KR)

(72) Inventor: Young Jin Kim, Goyang-si (KR)

(73) Assignee: Sallytec Co., Ltd., Seoul (KR)

( * ) Notice: Subject to any disclaimer, the term of this patent is extended or adjusted under 35 U.S.C. 154(b) by 401 days.

(21) Appl. No.: 17/927,159

(22) PCT Filed: May 7, 2021

(86) PCT No.: PCT/KR2021/005758
§ 371 (c)(1),
(2) Date: Nov. 22, 2022

(87) PCT Pub. No.: WO2021/241907
PCT Pub. Date: Dec. 2, 2021

(65) Prior Publication Data
US 2023/0190043 A1  Jun. 22, 2023

(30) Foreign Application Priority Data

May 27, 2020 (KR) .......................... 10-2020-0063945

(51) Int. Cl.
*B01F 27/808* (2022.01)
*A47J 43/07* (2006.01)
(Continued)

(52) U.S. Cl.
CPC ......... *A47J 43/0722* (2013.01); *A47J 43/085* (2013.01); *B01F 27/805* (2022.01);
(Continued)

(58) Field of Classification Search
CPC ....... B01F 27/805; B01F 31/40; A47J 43/105; A47J 43/1075; A47J 43/1081
(Continued)

(56) References Cited

U.S. PATENT DOCUMENTS

| 5,645,346 A * | 7/1997 | Thuna | A47J 43/085 366/205 |
|---|---|---|---|
| 6,027,242 A | 2/2000 | Thuma | |
| 2017/0224170 A1* | 8/2017 | Nernberger | A47J 43/085 |

FOREIGN PATENT DOCUMENTS

| KR | 19980030017 U | * | 8/1998 |
|---|---|---|---|
| KR | 2002-0056761 A | | 7/2002 |

(Continued)

OTHER PUBLICATIONS

International Search Report dated Aug. 5, 2021, issued in counterpart Application No. PCT/KR2021/005758, with English translation. (7 pages).

*Primary Examiner* — Jared O Brown
(74) *Attorney, Agent, or Firm* — WHDA, LLP

(57) ABSTRACT

Proposed is a vertically movable mixer including a container comprising a bottom portion in which a central through-hole is formed, a motor housing coupled to the container under the container, a motor built in the motor housing, a sliding member configured to reciprocally slidably move in a vertical direction through the central through-hole of the container, a rotatable shaft rotatably installed in the sliding member so as to be configured to reciprocally slidably move in the vertical direction in conjunction with the sliding member and axially mounted on a motor shaft of the motor so as to be configured to rotate by rotation of the motor, and a rotatable blade mounted on the rotatable shaft and configured to cut, grind, and mill food contained in the container while rotating and while reciprocally slidably moving in the vertical direction.

12 Claims, 3 Drawing Sheets

(51) Int. Cl.
  *A47J 43/08* (2006.01)
  *B01F 27/805* (2022.01)
  *B01F 31/40* (2022.01)
  *A47J 43/10* (2006.01)
  *B01F 101/06* (2022.01)

(52) U.S. Cl.
  CPC ............ *B01F 27/808* (2022.01); *B01F 31/40* (2022.01); *A47J 43/105* (2013.01); *A47J 43/1075* (2013.01); *B01F 2101/06* (2022.01)

(58) Field of Classification Search
  USPC ....................................................... 241/283
  See application file for complete search history.

(56) References Cited

FOREIGN PATENT DOCUMENTS

| | | | | |
|---|---|---|---|---|
| KR | 20070066716 | A | * | 6/2007 |
| KR | 10-2010-0107655 | A | | 10/2010 |
| KR | 20100107653 | A | * | 10/2010 |
| KR | 10-2014-0062922 | A | | 5/2014 |
| KR | 10-1469100 | B1 | | 12/2014 |
| KR | 10-2022492 | A | | 9/2019 |
| KR | 10-2022492 | B1 | | 9/2019 |
| KR | 10-2228759 | B1 | | 3/2021 |

\* cited by examiner

VERTICALLY MOVABLE MIXER

CROSS REFERENCE TO RELATED APPLICATION

The present application claims priority to Korean Patent Application No. 10-2020-0063945, filed May 27, 2020, the entire contents of which is incorporated herein for all purposes by this reference.

BACKGROUND OF THE INVENTION

Field of the Invention

The present disclosure relates generally to a mixer and, more particularly, to a vertically movable mixer suitable for allowing a rotatable blade to rotate while reciprocally linearly moving in the vertical direction.

Description of the Related Art

In general, mixers are electric devices used for processing foods such as fruits, vegetables, grains, etc. into various forms by chopping, juicing, mixing, cutting, or grinding (hereinafter, collectively referred to as "grinding" for convenience of explanation).

Conventional mixers typically include a motor housing with a built-in motor, a container coupled to the motor housing and provided with a rotatable blade for receiving the rotational force of the motor, and a lid for opening and closing an upper end of the container.

The rotatable blade provided inside the container may be mounted on a rotatable shaft of a blade assembly.

As an example of the blade assembly, Korean Patent No. 10-1469100 (published date: Dec. 4, 2014) discloses "A ROTATABLE SHAFT ASSEMBLY FOR A ROTATABLE BLADE OF ELECTRIC MIXER". Since the invention according to Korean Patent No. 10-1469100 is well discussed in the corresponding patent referenced above, a detailed description thereof will be omitted.

However, the above related-art technique has the following problems.

Rotatable blades for conventional mixers, including those disclosed in Korean Patent No. 10-1469100 as described above, are fixed rotatable blades that grind food while simply rotating in place.

Therefore, the conventional mixers require high-speed rotation more than necessary for grinding performance, so the motor is often overloaded. Nevertheless, a technique for solving this has not yet been developed.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art.

A first objective of the present disclosure is to provide a vertically movable mixer that allows a rotatable blade to cut, grind, and mill food (hereinafter, collectively referred to as "grind") while rotating and while reciprocally linearly moving in the vertical direction, thereby significantly improving the mixing performance and mixing efficiency for food compared to a conventional technique (fixed rotatable blade technique) that simply grinds food while rotating in place.

A second objective of the present disclosure is to provide a vertically movable mixer that can grind food more quickly and uniformly compared to a conventional mixer with a fixed rotatable blade under the condition of the same revolutions per minute (rpm) of a motor.

A third objective of the present disclosure is to provide a vertically movable mixer that can reduce the noise of the mixer, while achieving the same mixing effect compared to the conventional mixer with the fixed rotatable blade under the condition where the rpm of the mixer is reduced.

In order to achieve the above objectives, according to one aspect of the present disclosure, there is provided a vertically movable mixer including: a container including a bottom portion in which a central through-hole is formed; a motor housing coupled to the container under the container; a motor built in the motor housing; a sliding member configured to reciprocally slidably move in a vertical direction through the central through-hole of the container; a rotatable shaft rotatably installed in the sliding member so as to be configured to reciprocally slidably move in the vertical direction in conjunction with the sliding member, and axially mounted on a motor shaft of the motor so as to be configured to rotate by rotation of the motor; and a rotatable blade mounted on the rotatable shaft, and configured to cut, grind, and mill food contained in the container while rotating and while reciprocally slidably moving in the vertical direction.

The vertically movable mixer may further include: an upper bracket protruding downward from the bottom portion so as to communicate with the central through-hole formed in the bottom portion of the container; a circular tube-shaped bushing fastened to the upper bracket, and configured to hold the sliding member reciprocally linearly moving in the vertical direction; and a lower bracket fastened to either the bushing or the upper bracket, and configured to stop lowering of the sliding member to prevent the sliding member from being separated downward when lowered.

The vertically movable mixer may further include: an elastic member having a lower end resiliently supported on a lower end of the sliding member and an upper end resiliently supported on the bushing, and configured to provide a downward elastic force to push the sliding member downward.

The sliding member may include: a circular tube-shaped body having a vertical inner space with open top and bottom; a bent rib bent inward from an upper end of the body; and an elastic support ring bent inward from a lower end of the body and configured to resiliently support the lower end of the elastic member.

The lower bracket may include: a circular tube-shaped body fastened to the bushing; and a rib formed inward from a lower end of the body and configured to stop a lower portion of the sliding member from moving to prevent the sliding member from being separated downward when lowered.

The bushing may have an elastic support groove configured to resiliently support the upper end of the elastic member.

The vertically movable mixer may further include: a first shaft coupling member shaft-coupled to the motor shaft and configured to rotate by driving of the motor; and a second shaft coupling member having a first side shaft-coupled to the first shaft coupling member and a second side axially mounted on a lower end of the rotatable shaft, and configured to transmit a rotational force of the motor to the rotatable shaft.

A plurality of fitting grooves may be circumferentially formed at equal intervals on an inner circumferential surface of the first shaft coupling member, and a plurality of fitting protrusions may be circumferentially formed at equal intervals on an outer circumferential surface of the second shaft coupling member to fit into the fitting grooves.

The vertically movable mixer may further include: a bearing having an inner ring fixed to an outer circumferential surface of the rotatable shaft, and an outer ring fixed to an inner circumferential surface of the sliding member.

The vertically movable mixer may further include: an inner sealing member configured to provide a seal between the rotatable shaft and the sliding member in such a manner that an inner side thereof is in close contact with the rotatable shaft and an outer side thereof is in close contact with the sliding member; and an outer sealing member configured to provide a seal between the sliding member and the upper bracket in such a manner that an inner side thereof is in close contact with the sliding member and an outer side thereof is in close contact with the upper bracket.

The vertically movable mixer according to the present disclosure having the above configuration has the following effects.

First, the rotatable blade of the mixer can grind food while rotating and while reciprocally linearly moving in the vertical direction, thereby significantly improving the mixing performance and mixing efficiency for food compared to a conventional technique (fixed rotatable blade technique) that simply grinds food while rotating in place.

Second, the mixer can grind food more quickly and uniformly compared to a conventional mixer with a fixed rotatable blade under the condition of the same revolutions per minute (rpm) of the motor, thereby significantly improving the mixing performance and mixing efficiency for food.

Third, the mixer can reduce the noise of the mixer, while achieving the same mixing effect compared to the conventional mixer with the fixed rotatable blade under the condition where the rpm of the mixer is reduced.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
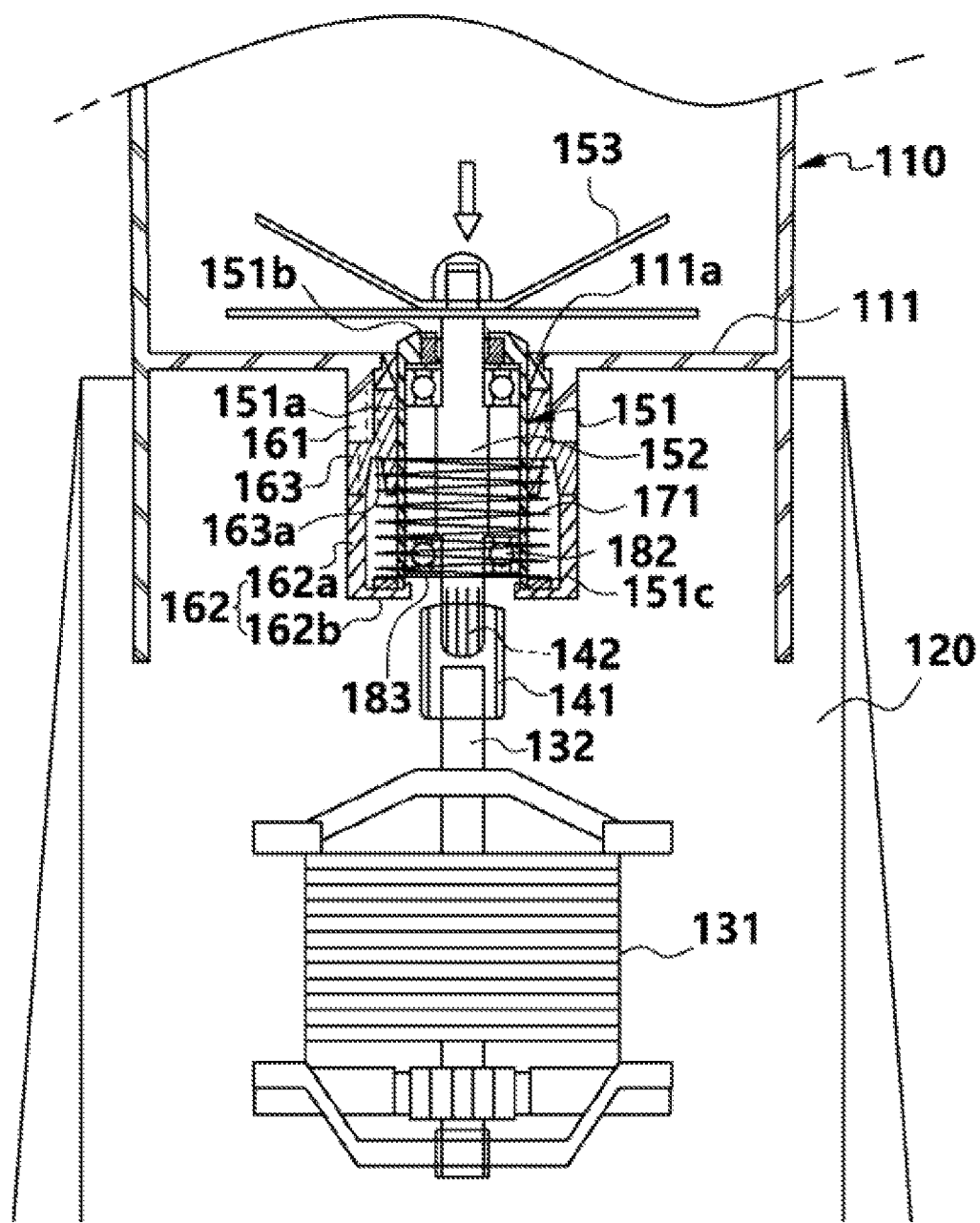
FIG. 1 is a schematic view illustrating the configuration of a vertically movable mixer according to an embodiment of the present disclosure in which a rotatable blade is located at bottom dead center (the bottommost point of reciprocal movement)
Figure 2:
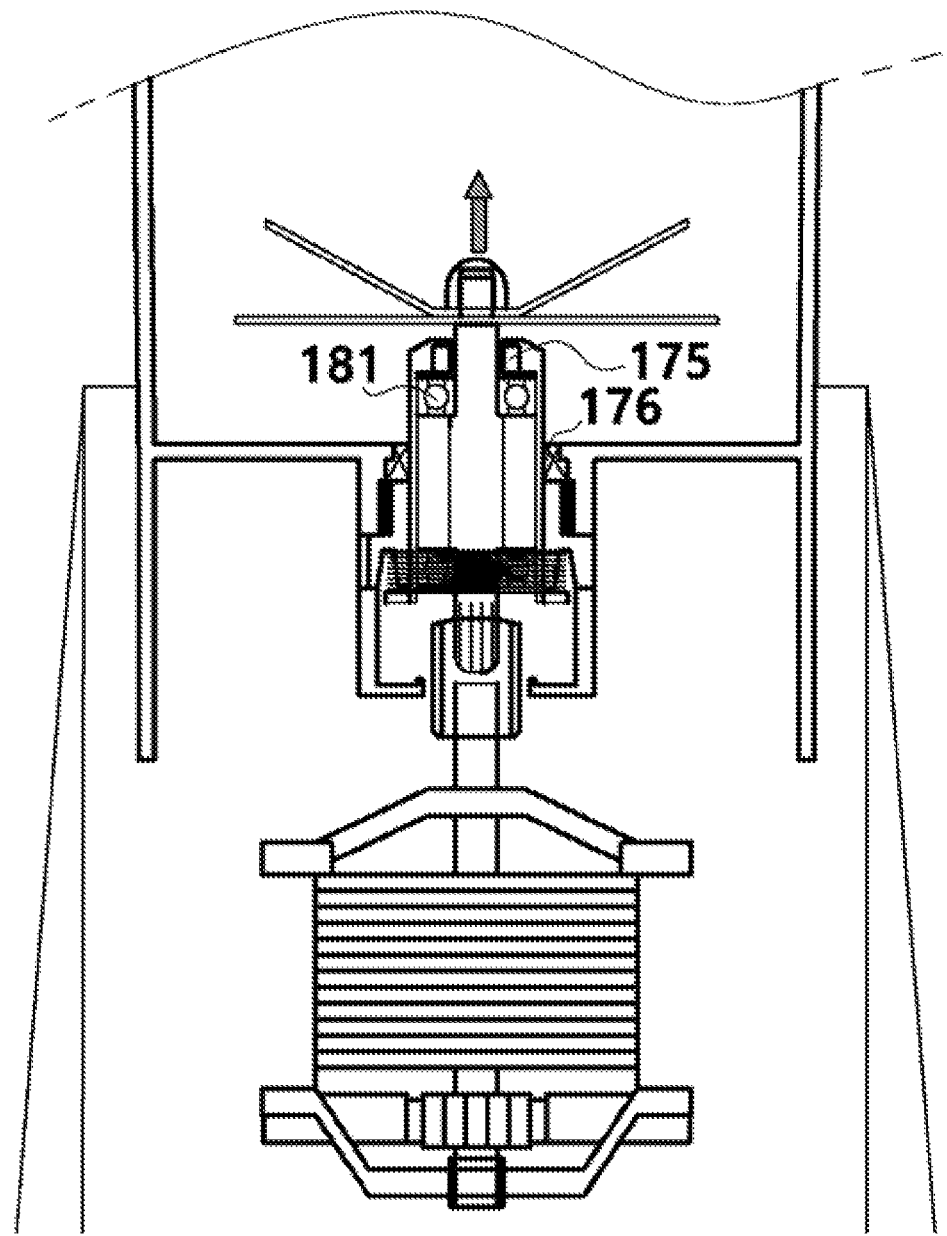
FIG. 2 is a schematic view illustrating the configuration of the vertically movable mixer according to the embodiment of the present disclosure in which the rotatable blade is located at top dead center (the topmost point of reciprocal movement)
Figure 3:
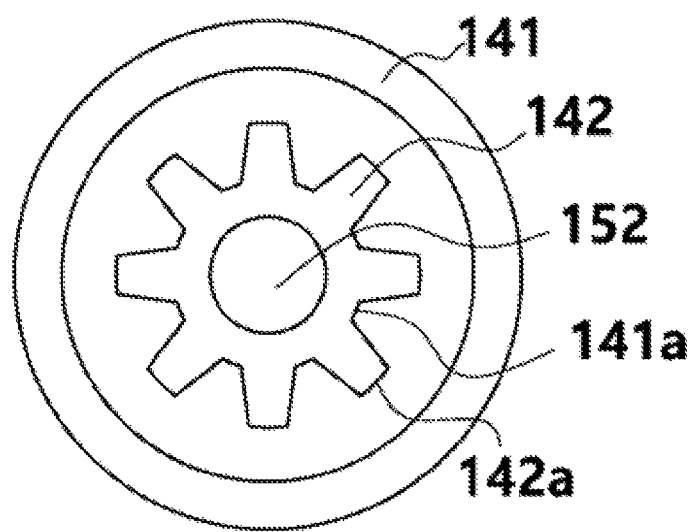
FIG. 3 is a sectional view illustrating the assembled main parts in which a rotatable shaft is shaft-coupled to a motor shaft by a first shaft coupling member and a second shaft coupling member according to the embodiment of the present disclosure.

Hereinafter, an exemplary embodiment of a vertically movable mixer according to the present disclosure will be described in detail with reference to the accompanying drawings.

The "vertically movable mixer" according to the present disclosure may mean "a mixer in which a rotatable blade can move in the vertical direction".

A vertically movable mixer according to an embodiment of the present disclosure may include a container 110, a motor housing 120, a motor 131, a sliding member 151, a rotatable shaft 152, and a rotatable blade 153.

The container 110 may include a bottom portion 111 in which a central through-hole 111a is formed. The motor housing 120 may be coupled to the container 110 under the container 110. The motor 131 may be built in the motor housing 120.

The sliding member 151 may have a vertical inner space with open top and bottom for slidably receiving the rotational shaft 152 which will be described later, and may reciprocally slidably move in the vertical direction through the central through-hole 111a formed in the bottom portion 111 of the container 110, that is, between a position above the central through-hole 111a and a position below the central through-hole 111a.

The rotatable shaft 152 may be rotatably axially installed in the sliding member 151 by vertically passing through the sliding member 151 to reciprocally slidably move in the vertical direction in conjunction with the sliding member 151, and may be axially mounted on a motor shaft 132 of the motor 131 to rotate by rotation of the motor 131.

The rotatable blade 153 may be mounted on the rotatable shaft 152 to cut, grind, and mill food contained in the container 110 by rotation of the rotatable shaft 152.

The rotatable shaft 152 and the rotatable blade 153 according to the embodiment of the present disclosure are characterized by cutting, grinding, and milling food while rotating, and while reciprocally slidably moving in the vertical direction in conjunction with a vertical reciprocal sliding movement of the sliding member 151.

As described above, since the rotatable blade 153 for cutting, grinding, and milling food (hereinafter, collectively referred to as "grinding") rotates, and at the same time, reciprocally linearly moves in the vertical direction, the vertically movable mixer according to the embodiment of the present disclosure has an advantage in that the mixing performance and mixing efficiency for food are improved compared to the related art (fixed blade) that grinds food while simply rotating in place.

In other words, the vertically movable mixer according to the embodiment of the present disclosure can improve the mixing performance and mixing efficiency for food compared to a conventional mixer with a fixed rotatable blade under the condition of the same revolutions per minute (rpm) of the motor.

In addition, the vertically movable mixer according to the embodiment of the present disclosure can achieve the same or superior mixing effect compared to the conventional mixer under the condition where the rpm of the mixer is reduced, thereby reducing the noise of the mixer.

The vertically movable mixer according to the embodiment of the present disclosure may further include a first shaft coupling member 141 shaft-coupled to the motor shaft 132 to rotate by driving of the motor 131, and a second shaft coupling member 142 having a first side shaft-coupled to the first shaft coupling member 141 and a second side axially mounted on a lower end of the rotatable shaft 152 to transmit the rotational force of the motor 131 to the rotatable shaft 152.

In addition, a plurality of fitting grooves 141a may be circumferentially formed at equal intervals on an inner circumferential surface of the first shaft coupling member 141, and a plurality of fitting protrusions 142a may be circumferentially formed at equal intervals on an outer circumferential surface of the second shaft coupling member 142 to fit into the fitting grooves 141a Through the fitting engagement between the fitting grooves 141a and the fitting protrusions 142a, the first shaft coupling member 141 and the second shaft coupling member 142 may be shaft-coupled in a geared manner.

Thus, the first shaft coupling member 141 and the second shaft coupling member 142 may be separable in the vertical direction, but not be separable in the lateral direction (horizontal direction) and maintain a coupled state.

The vertically movable mixer according to the embodiment of the present disclosure may further include a linear moving means (not illustrated) for reciprocally linearly moving the sliding member 151 in the vertical direction.

For example, the linear moving means may be an actuator (not illustrated) for reciprocally linearly moving the motor 131 in the vertical direction.

The actuator may move the sliding member 151 by a gear method or a cylinder method, for example.

The vertically movable mixer according to the embodiment of the present disclosure may further include an upper bracket 161, a bushing 163, and a lower bracket 162.

The upper bracket 161 may be formed in a substantially circular tube shape protruding downward from the bottom portion 111 so as to communicate with the central through-hole 111a formed in the bottom portion 111 of the container 110.

The bushing 163 may be formed in a circular tube shape, and may be fastened (e.g. screwed) to the upper bracket 161 to hold the sliding member 151 reciprocally linearly moving in the vertical direction.

The lower bracket 162 may be fastened to either the bushing 163 or the upper bracket 161, and may stop lowering of the sliding member 151 to prevent the sliding member 151 from being separated downward when lowered.

The bushing 163 may be formed to maintain a sliding tolerance (e.g. 0.01 mm) with the sliding member 151. Thereby, the bushing 163 may hold the sliding member 151 to prevent the sliding member 151 from becoming eccentric or being displaced axially, without interfering with a vertical reciprocal linear moment of the sliding member 151.

The lower bracket 162 may include a circular tube-shaped body 162a fastened to the bushing 163, and a rib 162b formed inward from a lower end of the body 162a to stop a lower portion of the sliding member 151 from moving to prevent the sliding member 151 from being separated downward when lowered.

The upper bracket 161 may be integrally formed with the bottom portion 111, or may be formed as a separate part and fastened to the bottom portion 111. Either case falls within the scope of the present disclosure.

The vertically movable mixer according to the embodiment of the present disclosure may further include an elastic member 171 having a lower end resiliently supported on a lower end of the sliding member 151 and an upper end resiliently supported on the bushing 163 so as to provide a downward elastic force to push the sliding member 151 downward.

The rotatable shaft 152 may be lowered at a slower speed than the motor shaft 132 when the sliding member 151 starts to be lowered after reaching top dead center (the topmost point of reciprocal linear movement). When the lowering speed of the motor shaft 132 is slower than that of the motor shaft 132 as described above, the rotatable shaft 152 may be separated from the motor shaft 132. Thus, the separation of the rotatable shaft 152 may be prevented by the elastic member 171.

This effect may be particularly noticeable when the connection (shaft coupling) method for connecting the rotatable shaft 152 and the motor shaft 132 is achieved by the first shaft coupling member 141 and the second shaft coupling member 142.

In the vertically movable mixer according to the embodiment of the present disclosure, the sliding member 151 may include a circular tube-shaped body 151a having a vertical inner space with open top and bottom, a bent rib 151b bent inward from an upper end of the body 151a, and an elastic support ring 151c bent inward from a lower end of the body 151a to resiliently support the lower end of the elastic member 171.

The elastic support ring 151c may be separately formed in a ring shape and may be screwed or fitted to the body 151a, or may be integrally formed to protrude from the body 151a.

In the vertically movable mixer according to the embodiment of the present disclosure, the bushing 163 may have an elastic support groove 163a for resiliently supporting the upper end of the elastic member 171.

The elastic member 171 may exert an elastic force downward, with the upper end thereof being resiliently supported by the elastic support groove 163a and the lower end thereof being resiliently supported by the elastic support ring 151c, thereby preventing the rotatable shaft 152 from being separated from the first shaft coupling member 141 when the sliding member 151 is lowered from top dead center.

The elastic support groove 163a of the bushing 163 may serve as a fixed elastic support point, and the elastic support ring 151c of the sliding member 151 may serve as a movable elastic support point of the elastic member 171.

The vertically movable mixer according to the embodiment of the present disclosure may further include a plurality of bearings 181 and 182 each of which has an inner ring fixed to an outer circumferential surface of the rotatable shaft 152 and an outer ring fixed to an inner circumferential surface of the sliding member 151 so as to allow the rotatable shaft 152 to be fastened to the sliding member 151 to be rotatable and simultaneously vertically slidable.

The bearings 181 and 182 may include an upper bearing 181 provided at an upper side of the sliding member 151 and a lower bearing 182 provided at a lower side of the sliding member 151.

To fix the lower bearing 182, a fixing ring 183 axially mounted on the rotatable shaft 152 may be further included.

The vertically movable mixer according to the embodiment of the present disclosure may further include an inner sealing member 175 and an outer sealing member 176.

The inner sealing member 175 may be positioned on the upper bearing 181 to provide a seal between the rotatable shaft 152 and the sliding member 151 in such a manner that an inner side thereof is in close contact with the rotatable shaft 152 and an outer side thereof is in close contact with the sliding member 151.

The outer sealing member 176 may provide a seal between the sliding member 151 and the upper bracket 161 in such a manner that an inner side thereof is in close contact with the sliding member 151 and an outer side thereof is in close contact with the upper bracket 161.

The operation of the vertically movable mixer according to the embodiment of the present disclosure having the above configuration will be described.

When the motor 131 rotates, the rotatable shaft 152 and the rotatable blade 153 may rotate integrally.

During the rotation of the rotatable shaft 152, as the sliding member 151 moves upward, the rotatable shaft 152 may also move upward with the upward movement of the sliding member 151. At this time, the rotatable blade 153 may rotate while moving upward to grind food.

The upward movement of the sliding member 151 causes the elastic member 171 to be compressed.

Meanwhile, the upward movement of the sliding member 151 may be achieved, for example, by moving the motor 131 upward by the operation of the actuator, or when the motor shaft 132 vertically movable is provided, by moving the movable motor shaft 132 upward by the operation of the actuator.

Then, when the elastic member 171 is maximally compressed or the elastic support ring 151c moved upward is stopped from moving by the lower end of the bushing 163, the sliding member 151 may become no longer movable upward and thus reach the top dead center (the topmost point).

When the actuator operates downward at the top dead center, the motor 131 may move downward. At this time, the compressed elastic member 171 may exert a force causing the sliding member 151 to be pushed downward, whereby the sliding member 151 may move downward by the downward movement by its own weight and the elastic force of the elastic member 171.

As the sliding member 151 moves downward, the rotatable shaft 152 may also move downward in conjunction with the downward movement of the sliding member 151. At this time, the rotatable blade 153 may rotate while moving downward to grind food.

When the sliding member 151 moves downward at a speed equal to or faster than the speed at which the motor 131 is lowered, the second shaft coupling member 142 may be lowered while stably maintaining a shaft coupled state without being separated from the first shaft coupling member 141.

Meanwhile, in the vertically movable mixer according to the embodiment of the present disclosure, an embodiment in which the sliding member 151 is movable in the vertical direction by moving the motor 131 in the vertical direction has been described exemplarily, but the present disclosure is not limited thereto. For example, an embodiment in which the motor shaft 132 is provided to be movable in the axial direction inside the motor 131 and the sliding member 151 is movable in the vertical direction by the actuator that causes the motor shaft 132 moving in the axial direction to reciprocally linearly move in the vertical direction also falls within the scope of the present disclosure.

Although a preferred embodiment of the present disclosure has been described in detail hereinabove, those skilled in the art will appreciate that various modifications, additions, and substitutions are possible, without departing from the scope and spirit of the present disclosure as disclosed in the appended claims. It is therefore to be understood that the embodiment described above is illustrative and not restrictive.

The scope of the present disclosure is defined in the appended claims, and that all modifications that come within the meaning and range of equivalency of the claims are intended to be included therein.

What is claimed is:

1. A vertically movable mixer comprising:
    a container comprising a bottom portion in which a central through-hole is formed;
    a motor housing coupled to the container under the container;
    a motor located in the motor housing;
    a sliding member configured to slidingly reciprocate in a vertical direction through the central through-hole of the container;
    a rotatable shaft rotatably installed in the sliding member so as to be configured to slidingly reciprocate in the vertical direction in conjunction with the sliding member, and axially mounted on a motor shaft of the motor so as to be configured to rotate by rotation of the motor; and
    a rotatable blade mounted on the rotatable shaft, and configured to cut, grind, and mill food contained in the container while rotating and while slidingly reciprocating in the vertical direction;
    an upper bracket protruding downward from the bottom portion so as to communicate with the central through-hole formed in the bottom portion of the container; and
    a lower bracket fastened to the upper bracket and configured to stop lowering of the sliding member to prevent the sliding member from being separated downward when lowered.

2. The vertically movable mixer of claim 1, further comprising:
    a circular tube-shaped bushing fastened to the upper bracket, and configured to hold the sliding member to facilitate the reciprocation in the vertical direction.

3. The vertically movable mixer of claim 2, further comprising:
    an elastic member having a lower end resiliently supported on a lower end of the sliding member and an upper end resiliently supported on the bushing, and configured to provide a downward elastic force to push the sliding member downward.

4. The vertically movable mixer of claim 3, wherein the sliding member comprises:
    a circular tube-shaped body having a vertical inner space with open top and bottom;
    a bent rib bent inward from an upper end of the body; and
    an elastic support ring bent inward from a lower end of the body and configured to resiliently support the lower end of the elastic member.

5. The vertically movable mixer of claim 4, wherein the lower bracket comprises:
    a circular tube-shaped body fastened to the bushing; and
    a rib formed inward from a lower end of the body and configured to stop a lower portion of the sliding member from moving to prevent the sliding member from being separated downward when lowered.

6. The vertically movable mixer of claim 3, wherein the bushing has an elastic support groove configured to resiliently support the upper end of the elastic member.

7. The vertically movable mixer of claim 1, further comprising:
    a first shaft coupling member coupled to the motor shaft and configured to rotate by driving of the motor; and
    a second shaft coupling member having a first side coupled to the first shaft coupling member and a second side axially mounted on a lower end of the rotatable shaft, and configured to transmit a rotational force of the motor to the rotatable shaft.

8. The vertically movable mixer of claim 7, wherein a plurality of fitting grooves are circumferentially formed at equal intervals on an inner circumferential surface of the first shaft coupling member, and a plurality of fitting protrusions are circumferentially formed at equal intervals on an outer circumferential surface of the second shaft coupling member to fit into the fitting grooves.

9. The vertically movable mixer of claim 1, further comprising:
a bearing having an inner ring fixed to an outer circumferential surface of the rotatable shaft, and an outer ring fixed to an inner circumferential surface of the sliding member.

10. The vertically movable mixer of claim 9, further comprising:
an inner sealing member configured to provide a seal between the rotatable shaft and the sliding member in such a manner that an inner side thereof is in contact with the rotatable shaft and an outer side thereof is in contact with the sliding member; and
an outer sealing member configured to provide a seal between the sliding member and the upper bracket in such a manner that an inner side thereof is in contact with the sliding member and an outer side thereof is in contact with the upper bracket.

11. A vertically movable mixer comprising:
a container comprising a bottom portion in which a central through-hole is formed;
a motor housing coupled to the container under the container;
a motor located in the motor housing;
a sliding member configured to slidingly reciprocate in a vertical direction through the central through-hole of the container;
a rotatable shaft rotatably installed in the sliding member so as to be configured to slidingly reciprocate in the vertical direction in conjunction with the sliding member, and axially mounted on a motor shaft of the motor so as to be configured to rotate by rotation of the motor;
a rotatable blade mounted on the rotatable shaft, and configured to cut, grind, and mill food contained in the container while rotating and while slidingly reciprocating in the vertical direction;
an upper bracket protruding downward from the bottom portion so as to communicate with the central through-hole formed in the bottom portion of the container; and
a circular tube-shaped bushing fastened to the upper bracket, and configured to hold the sliding member to facilitate the reciprocation in the vertical direction.

12. A vertically movable mixer comprising:
a container comprising a bottom portion in which a central through-hole is formed;
a motor housing coupled to the container under the container;
a motor located in the motor housing;
a sliding member configured to slidingly reciprocate in a vertical direction through the central through-hole of the container;
a rotatable shaft rotatably installed in the sliding member so as to be configured to slidingly reciprocate in the vertical direction in conjunction with the sliding member, and axially mounted on a motor shaft of the motor so as to be configured to rotate by rotation of the motor;
a rotatable blade mounted on the rotatable shaft, and configured to cut, grind, and mill food contained in the container while rotating and while slidingly reciprocating in the vertical direction;
an upper bracket protruding downward from the bottom portion so as to communicate with the central through-hole formed in the bottom portion of the container;
a circular tube-shaped bushing configured to hold the sliding member to facilitate the reciprocation in the vertical direction; and
a lower bracket fastened to either the bushing or the upper bracket, and configured to stop lowering of the sliding member to prevent the sliding member from being separated downward when lowered.

\* \* \* \* \*